Figure 2:
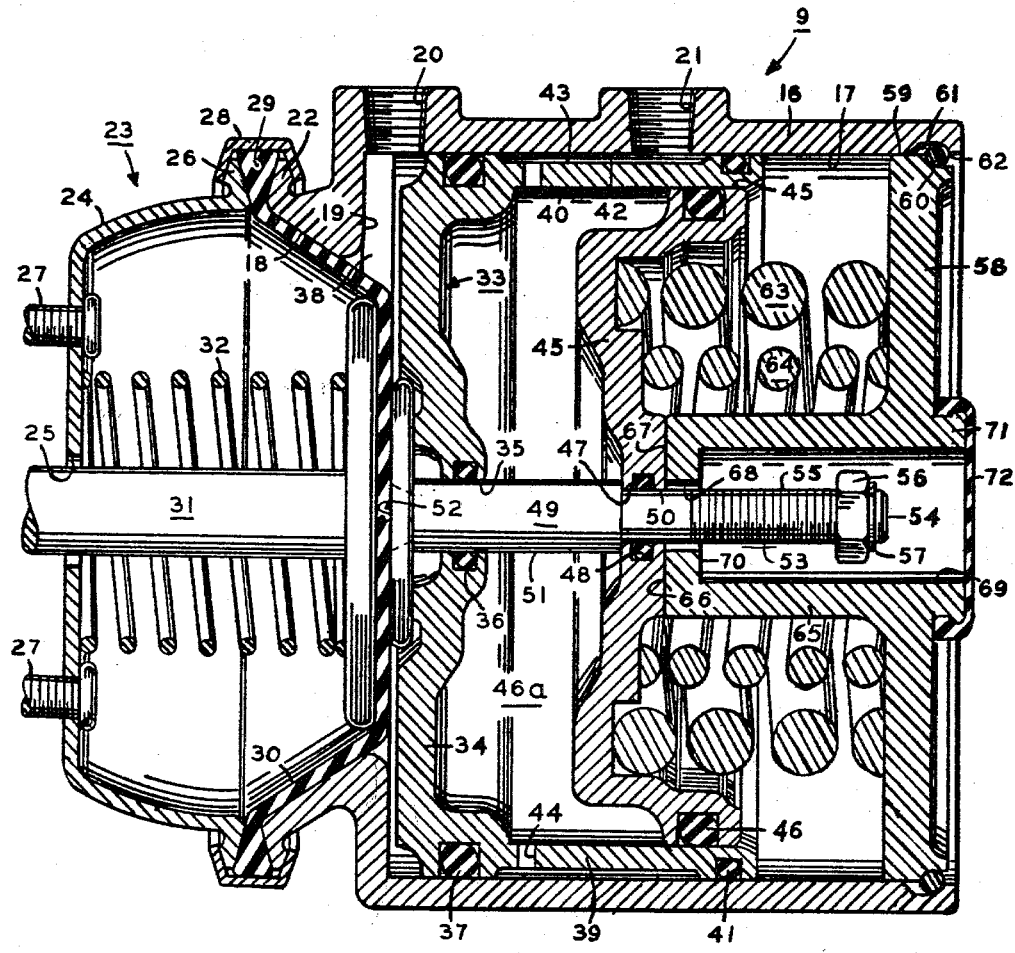

April 6, 1965     O. B. CRUSE     3,176,870

FRICTION DEVICE OPERATING MECHANISM

Original Filed Oct. 12, 1962     2 Sheets-Sheet 1

INVENTOR: OLIVER B. CRUSE
BY: *Joseph E. Papin*

INVENTOR: OLIVER B. CRUSE
BY: Joseph E. Papin

United States Patent Office 3,176,870
Patented Apr. 6, 1965

3,176,870
FRICTION DEVICE OPERATING MECHANISM
Oliver B. Cruse, Florissant, Mo., assignor to Wagner Electric Corporation, St. Louis, Mo., a corporation of Delaware
Original application Oct. 12, 1962, Ser. No. 230,140. Divided and this application Sept. 17, 1964, Ser. No. 397,253
4 Claims. (Cl. 220—4)

This is a division of co-pending application Serial No. 230,140, filed October 12, 1962, for Friction Device Operating Mechanism.

This invention relates to friction device operating mechanisms and in particular to those having resilient emergency actuating means therein.

In the past, many friction device operating mechanisms have been devised wherein resilient means were effective upon the failure of fluid pressure from a source of fluid pressure to mechanically energize a friction device normally energized by applying fluid pressure from said source to a fluid pressure responsive friction device actuator; however, an undesirable feature of such prior friction device operating mechanisms and systems was that the force of said resilient means and the force of said fluid pressure responsive actuator were concertly effective to energize said friction device, and if applied simultaneously, such additive forces frequently attained a magnitude great enough to damage the component parts of said friction device as well as other parts of the friction device operating system associated therewith.

The principal object of the present invention is to provide a friction device operating mechanism and system which overcomes the above-mentioned undesirable feature of the prior friction device operating mechanism and system.

Another object of the present invention is to provide a friction device operating mechanism which cannot be actuated by additive resilient and fluid pressure responsive means thereby obviating the possibility of damaging the friction device and other component parts of the friction device operating systems.

Another object of the present invention is to provide a friction device operating mechanism having a reduced length.

Still another object of the present invention is to provide a friction device operating mechanism having telescopically arranged and resiliently powered emergency pistons therein.

And still another object of the present invention is to provide a friction device operating mechanism having separable housing means removably secured together by securing means, and removable safety means to normally prevent removal of said securing means and separation of said housings.

These and still other objects and advantages will become apparent hereinafter.

Briefly, the invention embodies fluid pressure responsive actuator means for normally energizing a friction device in response to fluid pressure metered thereto from a source of fluid pressure, and a pair of piston means normally biased toward opposed inoperative positions by pressure fluid from said source, one of said piston means having a working end thereof urged by spring means toward an operative position to mechanically energize said friction device, and the other of said piston means being responsive to the metered fluid pressure from said source to oppose the spring force when said one piston means is in the operative position. The invention also embodies securing means for releasable engagement between separable housing means, and removable means to normally prevent release of said securing means.

Figure 1:
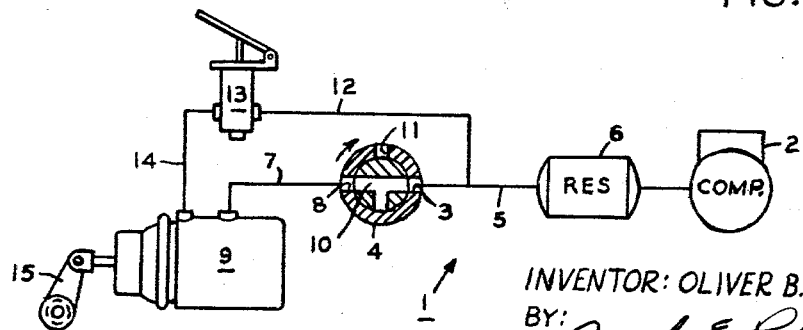
Figure 4:
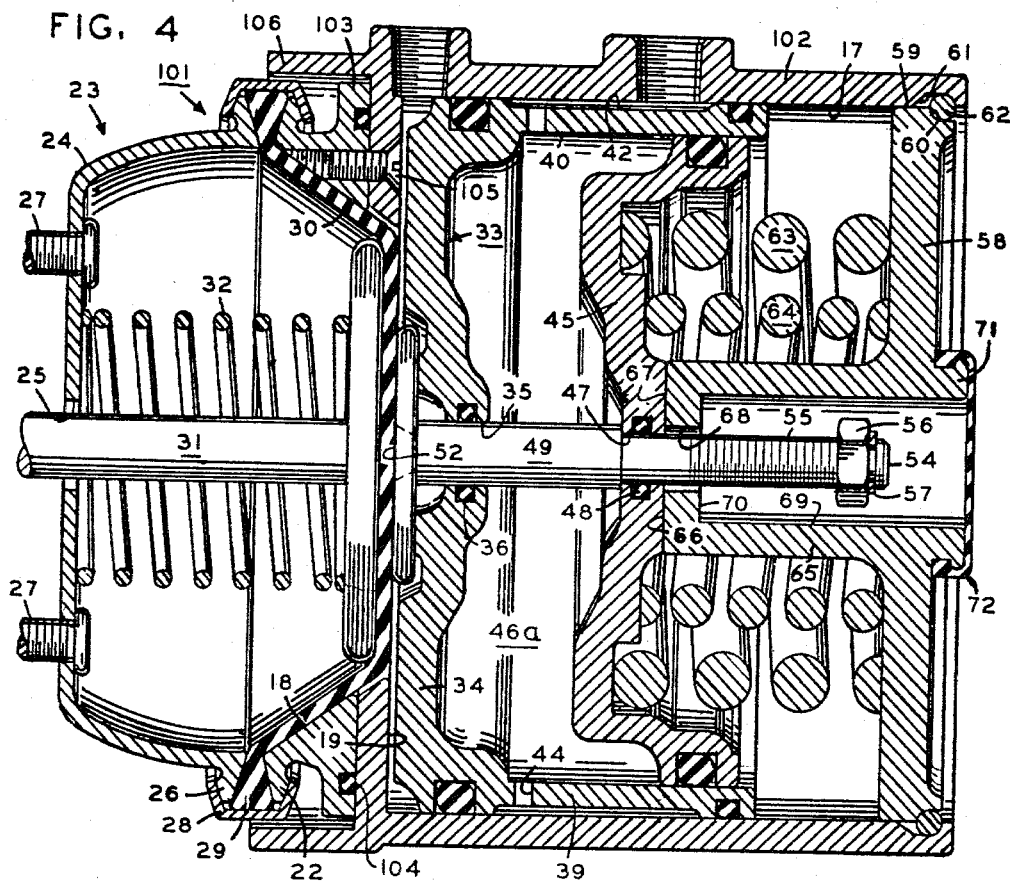
Figure 3:
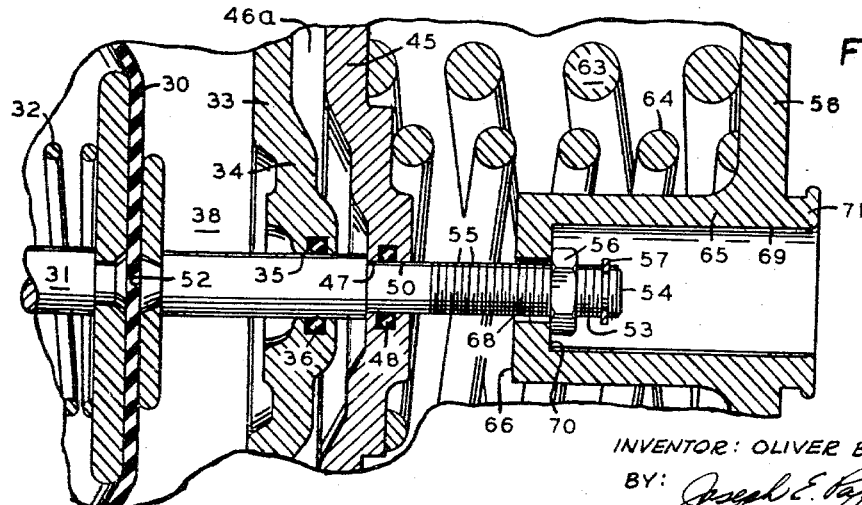

The invention also consists in the parts and in the arrangements and combination of parts hereinafter described and claimed. In the accompanying drawings which form a part of the specification and wherein like numerals refer to like parts wherever they occur:

FIG. 1 is a diagrammatic view of a friction device operating system showing a friction device operating mechanism embodying the present invention therein, FIG. 2 is a greatly enlarged cross-sectional view of the friction device operating mechanism shown in FIG. 1, FIG. 3 is a fragmentary cross-sectional view showing the emergency piston of FIG. 2 biased toward an operative position, and FIG. 4 is a cross-sectional view of another friction device operating mechanism embodying the present invention.

Referring now to FIG. 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing, in combination with the compressor 2, a source of fluid pressure. Another conduit 7 is interposed between an outlet 8 of the charging valve 4 and the emergency port of a friction device operating mechanism or actuating cylinder 9. The charging valve 4 is provided with rotatable passage means 10 connecting the inlet 3 with the outlet 8; however, said passage means 10 can be rotated clockwise (in the direction of the arrow) to a position interrupting pressure fluid communication between said inlet and outlet and establishing pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

The actuating cylinder 9, FIG. 2, is provided with a housing 16 having a bore 17 and an axially aligned tapered bore 18 with a shoulder 19 formed at the juncture of said bore and tapered bore. A service port 20 which receives the conduit 14, as previously mentioned, is provided in the housing 16 connecting with the bore 17 adjacent to the shoulder 19, and an emergency port 21 which receives the conduit 7, as previously mentioned, is also provided in the housing 16 connecting with the bore 17 adjacent to the mid-portion thereof. The housing 16 is also provided with a peripheral flange 22 on the leftward end thereof, and a mounting end plate or fixed housing 23 is provided with a concave or dish-shaped end wall 24 having a centrally located venting aperture 25 therein and a peripheral flange 26 positioned in opposed relation with the peripheral flange 22. The end plate housing 23 is also provided with a plurality of mounting studs 27 which are fixedly attached to the end wall 24 by suitable means, such as an upset weld, said mounting studs being adapted for connection with a cooperating mounting bracket (not shown) on or adjacent the friction device. A conventional releasable clamping band 28 is positioned in clamping engagement between the opposed peripheral flanges 22 and 26 serving to maintain a peripheral bead 29 of a diaphragm 30 clamped in sealable abutting engagement therebetween. A push rod 31 extends coaxially through the venting aperture 25 having an exterior or working end pivotally connected with the slack adjuster 15, as previously mentioned, and an interior end biased into engagement with the diaphragm 30 by the compressive force of a return spring 12 interposed between the housing end wall 24 and said push rod.

A movable wall member or cup-shaped piston 33 is provided with a radially extending head portion 34 normally in abutting engagement with the shoulder 19, and a centrally located aperture or bore 35 is provided in the head portion 34 having an O-ring 36 sealably disposed therein. Another O-ring 37 is sealably disposed in the peripheral surface of the head portion 34 in sealable engagement with the housing bore 17 wherein an expansible service or actuating chamber 38 is formed in the housing bore 17 and tapered bore 18 between the diaphragm 30 and the head portion 34 of the piston 33, said actuating chamber 37 being in open pressure fluid communication with the service port 20 at all times. An axially extending sleeve portion 39 is integrally formed with the piston head 34 and is provided with a bore 40 therein, and the rightward or free end of said sleeve 39 is slidably engaged with the portion of the housing bore 17 rightwardly of the emergency port 21. Another O-ring 41 is sealably disposed in the peripheral surface of the sleeve 39 adjacent to the free end thereof in sealable engagement with the housing bore 17, and an annular recess 42 is provided in the peripheral surface of said sleeve intermediate the O-rings 37 and 41 forming an annular chamber 43 between said sleeve and the housing bore 17 which is at all times in pressure fluid communication with the emergency port 21. A plurality of cross passages 44 are provided in the sleeve 39 adjacent the leftward end thereof to connect the annular chamber 43 with the sleeve bore 40.

A cup-shaped emergency piston 45 is slidably received in the piston sleeve bore 40 having an O-ring 46 sealably disposed in the peripheral surface thereof in sealable engagement with said sleeve bore, and an emergency chamber 46a is formed in said sleeve bore between said emergency piston and the head portion 34 of the piston 33, said emergency chamber being in fluid pressure communication with the emergency port 21 at all times through the passages 44 and annular chamber 43. The emergency piston 45 is also provided with the centrally located aperture 47 having an O-ring 48 sealably disposed therein, and a piston extension or driven member 49 is provided with a reduced portion 50 adjacent the mid-portion thereof which is slidably received in the emergency piston aperture 47 in sealable engagement with the O-ring 48 therein. The driven member 49 is provided with an extension portion 51 leftward of the reduced portion 50 which is slidably received in the bore 35 of the piston 33 in sealable engagement with the O-ring seal 36 therein, and a working end 52 is provided on the leftward extension portion 51 in the actuating chamber 38 normally in abutting or driving engagement with the diaphragm 30. The driven member 49 is also provided with an extension portion 53 rightward of the reduced portion 50, and a free end 54 is provided on the rightward extension portion 53. The rightward extension portion 53 is threaded, as at 55, substantially between the reduced portion 50 and the free end 54 thereof, and a driving nut or member 56 is threadedly received thereon (to be discussed hereinafter). A snap or retaining ring 57 is carried in the rightward extension 53 adjacent to the free end 54 thereof to retain said driving member 56 against displacement.

A removable annular base wall or closure member 58 is provided with a peripheral surface 59 in sliding and guiding engagement in the rightward end of the housing bore 17, and an annular recess 60 is provided in said annular surface. The housing bore 17 is also provided with an annular recess 61 adjacent the rightward or free end thereof, and a split lock or retaining ring 62 is positioned in said housing recess 61. The compressive forces of concentrically positioned emergency springs 63 and 64 interposed between the emergency piston 45 and the base wall 58 serve not only to bias the emergency piston 45 and extension 49 in a leftwardly working direction but also serve to bias the base wall recess 60 into abutting engagement with the retaining ring 62 in the housing recess 61 to retain said base wall against displacement from the housing bore 17. The base wall 58 is provided with a centrally located cylindrical extension 65 having an abutment surface 66 on the interior or free end 67 thereof for engagement with the emergency piston 45, and stepped bores 68 and 69 are centrally provided through the cylindrical base wall extension 65 in coaxial spaced relation with the rightward extension portion 53 of the driven member 49. A shoulder or bearing surface 70 is formed at the juncture of the stepped bores 68 and 69, and the exterior end 71 of the cylindrical base wall extension 65 is closed by a closure member, such as resilient boot 72, to prevent the entry of foreign particles into the stepped bores 68 and 69 and the housing bore 17.

In the operation with the component parts of the actuating cylinder 9 positioned as above described, assume that normal operating conditions exist wherein the reservoir 6 is charged with fluid pressure above a predetermined amount from the compressor 2, and said reservoir is connected in fluid pressure communication with the emergency chamber 46a through the sleeve passage 44, the annular chamber 43, the emergency port 21 of the housing 16, the conduit 7, the outlet 8 of the control valve 4, passage means 10 and inlet 3, and the conduit 5. The fluid pressure so transmitted to the emergency chamber 46a acts on the effective area of the piston 33 to normally engage the piston head 34 with the housing shoulder 19, and said fluid pressure also acts on the effective area of the emergency piston 45 creating an emergency force to maintain said emergency piston in an inoperative or non-working position in abutment with the free end 67 of the base wall extension 65 against the compressive force of the compressed emergency springs 63, 64. With the component parts of the actuating cylinder 9 positioned as above described and as shown in the drawings, the friction device (not shown) is deenergized.

If the operator desires to make a normal service application to energize the friction device and effect deceleration or a complete stop, a manual force applied on the application valve 13 meters fluid pressure from the reservoir 6 through the conduits 5 and 12, said application valve, the service line 14, the service port 20 of the housing 16, and into the actuating chamber 38. The fluid pressure so established in the actuating chamber 38 acts on the effective area of the diaphragm 30 to create a service or actuating force to move said diaphragm and push rod 31 leftwardly against the return spring 32 actuating the working end of said push rod to rotate the slack adjuster 15 and energize the friction device. It should be noticed that the fluid pressure in the actuating chamber 38 acting on the effective area of the piston 33 creates an opposite service force which is substantially equal to the service force, and said opposite force is opposed by the fluid pressure in the emergency chamber 46a acting on the effective area of the piston 33; therefore, the piston 33 normally remains in its original position in engagement with the housing shoulder 19. Removal of the applied force from the application valve 13 effects exhaustion of fluid pressure from the actuating chamber 38 through the service port 20, the conduit 14 and the exhaust port of the application valve 13 to eliminate the actuating force, and the compressive force of the return spring 32 moves the slack adjuster 15, the push rod 31, and the diaphragm 30 to their original positions.

In an emergency operating condition when the pressure in the reservoir 6 is reduced below the predetermined amount due to leaks in the system 1 or a non-producing compressor 2, or the like, the fluid pressure in the emergency chamber is correspondingly reduced thereby reducing the emergency force opposing the compressive forces of emergency springs 63, 64. When the magnitude of the spring forces overcomes that of the reduced emergency force, the emergency springs 63, 64 move the emergency piston 45 leftwardly in a working direction in the sleeve bore 40 toward an operative position adjacent the piston head 34. The piston extension 49 is concertly moved with said emergency piston to actuate the leftward or working end 52 thereof in a work-producing direction in the actuating chamber 38 effecting simultaneous leftward movement of the diaphragm 30 and push rod 31 to rotate the slack adjuster 15 and effect mechanical emergency energization of the friction device.

During this mechanical emergency energization of the friction device, it should be noticed that the operator may make a service application, as previously described; however, when the magnitude of the opposite service force created upon the introduction of service fluid pressure into the actuating chamber 38 overcomes the magnitude of the force created by the reduced fluid pressure in the emergency chamber 46a acting on the effective area of the piston head 44, the piston 33 is moved rightwardly in the housing bore 17 into engagement with the emergency piston 45 to oppose the compressive forces of emergency springs 63, 64. Since the opposite force and the service force are substantially equal in magnitude, it is apparent that the opposite force opposes the compressive force of springs 63, 64 to reduce the magnitude thereof and obviate the compounding of the spring forces and the service force. In other words, the substantially equal and opposing service and opposite forces limit the intensity of the mechanical energization of the friction device under emergency operating conditions by preventing compounding of the friction device energizing forces thereby obviating the possibility of damaging the friction device and/or other component parts of the system 1 and cylinder 9. When the service appliction is terminated and the fluid pressure is exhausted from the actuating chamber 38, as above described, the reduced fluid pressure in the emergency chamber acting on the effective area of the piston head 34 will return the piston 33 to its original position while the compressive forces of springs 63, 64 serve to maintain the mechanical energization of the friction device.

With the component parts of the system 1 and actuating cylinder positioned as above described, the friction device is mechanically energized to effect a vehicle emergency stop. Often such emergency stops occur at inopportune times and place the vehicle in a dangerous position with regard to other vehicles on the road; therefore, after such emergency stop occurs, it is often advantageous to move the vehicle to a less dangerous position in order to correct the failure of the system 1 and subsequently reestablish normal operating conditions wherein the fluid pressure is greater than the predetermined amount.

Referring now to FIGS. 2 and 3, the driving member 56 is provided for bearing engagement with the shoulder 70 in the base wall extension 65 to positively contain the compressive forces of springs 63, 64 and retractively move the emergency piston 45 to its inoperative position to de-energize the friction device under emergency conditions, as hereinafter described. With the boot 71 removed from the base wall extension 65, a tool (not shown) is inserted into the cylinder bore 69 into driving engagement with the driving member 56. When a manual force is applied to rotate the tool and driving member 56, the threaded engagement between said driving member and the rightward piston extension 53 effects leftward movement of said driving member into abutting bearing engagement with the shoulder 70 in the end wall extension 65; and upon further rotation of the driving member 56, the threaded engagement effects concert rightward movement of the driven member 49 and emergency piston 45 in the sleeve bore 40 of the piston 33 against the compressive force of the springs 63, 64. In view of the above, it is apparent that the compressive forces of springs 63, 64 are now positively contained between the emergency piston 45 and the base wall 58 through the bearing engagement of the driving member 56 and shoulder 70. When the emergency piston 45 is so moved to its inoperative position, return spring 32 also moves the parts associated with said emergency piston and piston extension 49 in follow-up relation wherein the friction device is de-energized so that the vehicle can now be moved to a more advantageous and less dangerous position. With the force of the emergency springs 63, 64 so contained, the clamping band 28 may be removed to effect separation of the separable housings 16 and 23 wherein the various component parts in the actuating chamber 38 can be serviced without fear of the housing 16 being expelled from the end plate 23 by the force of said emergency springs. Upon said disassembly of the housings 16 and 23, the base wall 58 and power piston 45 and parts associated therewith are manually movable toward the left in the piston bore 40 and cylinder bore 17, respectively, so that the snap ring 62 can be removed from the groove 61 which subsequently permits removal of all of the component parts from the cylindrical bore 17 for the service purpose.

When the fluid pressure failure has been corrected and the fluid pressure in the reservoir 6 is increased to an amount greater than the predetermined amount wherein normal operating conditions are now re-established, the fluid pressure in the emergency chamber 46a of the actuating cylinder 9 is correspondingly increased to return the piston 33 to its original position, if need be, and to re-establish the magnitude of the emergency force. When the magnitude of the emergency force overcomes that of the compressive forces of springs 63, 64, the emergency piston 45 will be maintained in its inoperative position, and the driving member 56 may now be freely returned to its original position adjacent the free end 54 of the rightward piston extension 53.

Of course, the operator may initiate the emergency function of the actuating cylinder 9, if desired, by "dynamiting" the system 1. To "dynamite," the operator merely rotates the rotatable passage means 10 of the charging valve 4 in a clockwise direction (as shown by the arrow in FIG. 1) to align the passage means 10 between the outlet 8 and the exhaust port 11 thereby exhausting fluid pressure from the emergency chamber 46a of the cylinder 9 through the passage 44, annular passage 42 and emergency port 21 into the conduit 7 and therefrom via said outlet, passage means and exhaust port of the charging valve 4 to atmosphere. With the emergency chamber 46a vented to atmosphere, the emergency functions of the actuating cylinder 9 is initiated, as described hereinbefore, to energize the friction device.

Referring now to FIG. 4, a friction device operating mechanism 101 is shown having substantially the same component parts and functioning in the same manner as the previously described friction device operating mechanism with the following exceptions. The friction device operating mechanism or actuating cylinder 101 is provided with separable housings 102 and 103 having an O-ring 104 sealably disposed therebetween, and a plurality of screws 105 normally retain said housings against displacement. The housing 102 is provided with a plurality of axially extending, integrally formed extensions or fingers 106 which extend into radially spaced relation with the clamping band 28. The extensions 106 are juxtaposed with the removable clamping band 28 to obviate removal thereof from the flanges 22 and 26 of the housings 23 and 103 until the housings 102 and 103 are disassembled. To disassemble the housings 102 and 103, the driving member 56 is actuated to positively contain the forces of the emergency springs 63, 64 between the power piston 45 and the base wall 58, and the component parts in the housing bore 17 are removed therefrom, as previously described. Upon removal of the component parts from the housing bore 17, a screw driver or the like (not shown) can be inserted through the housing bore 17 to remove the screws 105 to separate the housings 102 and 103 and move the extensions 106 from spaced relation with the clamping band 28. The clamping band 28 can now be removed from engagement between the housings 23 and 103 in order to service the diaphragm 30 and other component parts within the housing 23.

It is apparent that the housing extensions 106 are provided in juxtaposition with the removable clamping band 28 to normally obviate the removal thereof from clamping engagement with the housings 23 and 103. This is a safety feature to prevent expulsion of the housings 102 and 103 from the housing 23 by the forces of the emergency springs 63 and 64 in the event that emergency conditions prevail in the actuating cylinder 101 or that said actuating cylinder has been dynamited.

It is also apparent that the component parts in the housing bore 17 must be removed therefrom which, of course, obviates the propelling effect of the emergency springs 63, 64 on the housing 102 and 103 before the screws 105 can be removed to separate housings 102 and 103 and move the extensions 106 from their normal spaced relation with the clamping band 28.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

The embodiments of the invention in which an exclusive property or privilege is claimed are defined as follows:

1. In a friction device operating mechanism including a pair of separable housings and an end plate, removable means connecting said housings against separation, clamping means removably engaged between said end plate and one of said housings to normally prevent separation thereof, and extension means on the other of said housings normally juxtaposed with said clamping means to prevent removal thereof until said removable means are removed to effect separation of said housings.

2. In a friction device operating mechanism including first, second and third separable housings, first and second removable means connecting said first and second housings and said second and third housings against separation, respectively, and obstruction means on said first housing extending into juxtaposition with said second removable means to normally prevent removal thereof until said first removable means are removed to effect separation of said first and second housings.

3. In a friction device operating mechanism including first, second and third separable housings, first and second removable means connecting said first and second housings and said second and third housings against separation, respectively, and extension means connected with said first housing and extending into juxtaposition with said second removable means normally preventing removal thereof, said first and second housings being separated upon removal of said first removable means, and said extension means being movable with said first housing from juxtaposition with said second removable means to permit subsequent removal thereof and effect separation of said first and second housings.

4. In a friction device operating mechanism including a pair of separable housings, removable means connecting said housings against separation, an end plate, radially displaceable securing means normally positioned in clamping engagement between said end plate and one of said housings to prevent separation thereof, and axially extending means on the other of said housings extending into spaced relation with said securing means to normally prevent radial displacement thereof, said extending means being movable from spaced relation with said securing means to permit radial displacement thereof and subsequent separation of said one housing and end plate only after said removable means are removed to effect separation of said housings.

No references cited.

RICHARD B. WILKINSON, *Primary Examiner.*